United States Patent [19]

Takamura

[11] Patent Number: 5,198,932
[45] Date of Patent: Mar. 30, 1993

[54] ZOOM LENS ASSEMBLY

[75] Inventor: Masashi Takamura, Tokyo, Japan

[73] Assignee: Fuji Photo Film Co., Ltd., Kanagawa, Japan

[21] Appl. No.: 791,317

[22] Filed: Nov. 14, 1991

[30] Foreign Application Priority Data

Nov. 14, 1990 [JP] Japan .................. 2-307974

[51] Int. Cl.$^5$ .................................. G02B 15/14
[52] U.S. Cl. ............................ 359/694; 359/696; 359/829; 354/195.12
[58] Field of Search ............... 359/694, 695, 696, 699, 359/700, 823, 825, 826, 829; 354/400, 195.12, 286

[56] References Cited

U.S. PATENT DOCUMENTS

| | | | |
|---|---|---|---|
| 3,914,026 | 10/1975 | Kanno | 359/825 |
| 3,997,245 | 12/1976 | Uesugi | 359/823 |
| 4,333,712 | 6/1982 | Tomori | 359/700 |
| 4,468,107 | 8/1984 | Yabe | 359/825 |

FOREIGN PATENT DOCUMENTS 1-306808 12/1989 Japan .

*Primary Examiner*—Loha Ben
*Attorney, Agent, or Firm*—Young & Thompson

[57] ABSTRACT

A zoom lens assembly has a stationary barrel, a middle barrel and a movable barrel. The middle barrel is formed on its outer periphery at a rear end thereof with a helicoidal thread, which engages with a helicoidal thread formed on the inner surface of the stationary barrel. The movable barrel holds a zoom lens system therein, and is formed on its outer periphery at a rear end portion with a helicoidal thread which engages with a helicoidal thread formed in the inner surface of the middle barrel. The middle barrel is provided at its rear end portion with a driven gear having a small face width. The driven gear meshes with a drive gear through a cut-out of the stationary barrel. Rotational movement of a zoom motor is transmitted to the driven gear of the middle barrel through the drive gear, so that the middle barrel is rotated to move in the direction of the optical axis of the assembly. The gearing portion of the drive gear moves along with the axial movement of the driven gear, so as to maintain the engagement between these gears.

34 Claims, 9 Drawing Sheets

ZOOM LENS ASSEMBLY

BACKGROUND OF THE INVENTION

1. Field of the Invention

The present invention relates to a zoom lens assembly for use in a photographic camera, a video camera or the like. The present invention relates more particularly to a zoom lens assembly capable of extending a movable barrel a substantial distance.

2. Prior Art

Cameras, including compact cameras and 8 mm video cameras, provided with zoom lens assemblies are widely used. In this type of cameras, the movable barrel of the zoom lens assembly is adapted to retract into the camera body until the movable barrel does not protrude from the camera body when the camera is not in use, so as to facilitate carrying and storing the camera. Recently, cameras with zoom lenses have been given a larger zooming ratio by increasing the maximum stroke or extension of the movable barrel. It is also desirable for such a zoom lens assembly having a large zoom ratio to be compact in the unused state.

FIG. 9 of the accompanying drawings shows an example of a conventional zoom lens assembly having a double helicoid mechanism. A camera body 9 is assembled fixedly with a stationary barrel which is formed with an internal helicoidal thread 11a, and a front cover 100 is secured to the camera body 9 so as to cover the stationary barrel 11. The internal helicoidal thread 11a engages with an external helicoidal thread 12a formed on a peripheral part of a middle barrel 12. The middle barrel 12 is also formed with a gear portion 12b through which the middle barrel 12 is rotated by a motor 13. The length of the gear portion 12b of the middle barrel 12 in the direction of the optical axis P of the lens assembly is approximately equal to the maximum amount of axial movement of the middle barrel 12.

The middle barrel 12 is further formed with an internal helicoidal thread 12c, which engages with an external helicoidal thread 16a formed on a peripheral part of a movable barrel 16. A first lens group 14 and a second lens group 15 constituting the optical system of the zoom lens assembly are assembled in the movable barrel 16. When the middle barrel 12 rotates, the movable barrel 16 moves axially forward and backward parallel to the optical axis of the lens assembly, while guided along a straight movement guide member 17. A protection barrel 18 cover the gear portion 12b of the middle barrel 12 is provided because the gear portion 12b would otherwise be outwardly exposed when the movable barrel 16 protrudes from the front cover 10.

Because the gear portion 12b of the middle barrel 12 has an axial length approximately equal to the maximum axial movement of the middle barrel 12, the production cost of the above-described conventional zoom lens assembly is high. Furthermore, the need for the protection barrel 18 increases the external diameter of the middle barrel 12 by an amount corresponding to the thickness of the protection barrel 18. Because the movable barrel 16 is guided along the straight movement guide member 17, it is necessary to elongate the straight movement guide member 17 in order to increase the maximum stroke of the movable barrel 16. However, such an elongated straight movement guide member 17 would project from the front end of the movable barrel 16 when the movable barrel 16 moves back into a retracted position, unless the stationary barrel 11 is also elongated so as to cover the front end of the straight guide member 17. But such an elongated stationary barrel would enlarge the camera body.

In order to solve the above problem, a zoom assembly has been suggested, for example in Japanese Laid-Open Patent Appln. No. 1-306808, wherein a lens guide ring, which corresponds to the straight guide member, is movable along with a cam ring so as to reduce the axial length of a stationary barrel. Because a cam surface formed on the cam ring will be exposed to the image-forming portion of the zoom lens assembly when the cam ring moves outwardly, a cover barrel is provided for covering the cam surface. Accordingly, although the axial length may be reduced, the diameter of the stationary barrel must be increased by the cover barrel.

SUMMARY OF THE INVENTION

A primary object of the present invention is to provide a zoom lens assembly which makes it possible to increase the maximum stroke of the movable barrel while maintaining the compactness of the camera.

Another object of the present invention is to provide a zoom lens assembly whose stationary barrel is small in size, so that the zoom lens assembly is compact in its retracted position.

The above and other objects are achieved by providing a middle barrel for moving a movable barrel in the direction of the optical axis, and a middle barrel driving device for rotating the middle barrel, wherein the middle barrel is formed on its trailing end with a first gear, and the middle barrel driving device has a second gear meshing with the first gear, such that the middle barrel is moved in the axial direction by being rotated by the middle barrel driving device while the first gear is maintained engaged with the second gear.

According to a preferred embodiment of the present invention, a helical gear is used as the middle barrel driving device, whose length is approximately equal to the amount of axial movement of the first gear, and which rotates the first gear so as to move it in the axial direction.

According to another embodiment, the middle barrel driving device comprises a pinion gear and a gear sliding mechanism for moving the pinion gear in the axial direction.

According to the present invention, it is unnecessary to make the pitch of the first gear larger. Furthermore, the first gear will not be exposed outside the camera body, so that a protection barrel as used in the above-described conventional zoom lens assembly is unnecessary. By omitting the protection barrel, not only the cost but also the diameter of the zoom lens assembly is decreased. This contributes to making the camera compact.

BRIEF DESCRIPTION OF THE DRAWINGS

The above and other objects and advantages of the present invention will become apparent from the following detailed description of preferred embodiments when read in conjunction with the appended drawings, wherein.

DETAILED DESCRIPTION OF THE PREFERRED EMBODIMENTS

Figure 1:
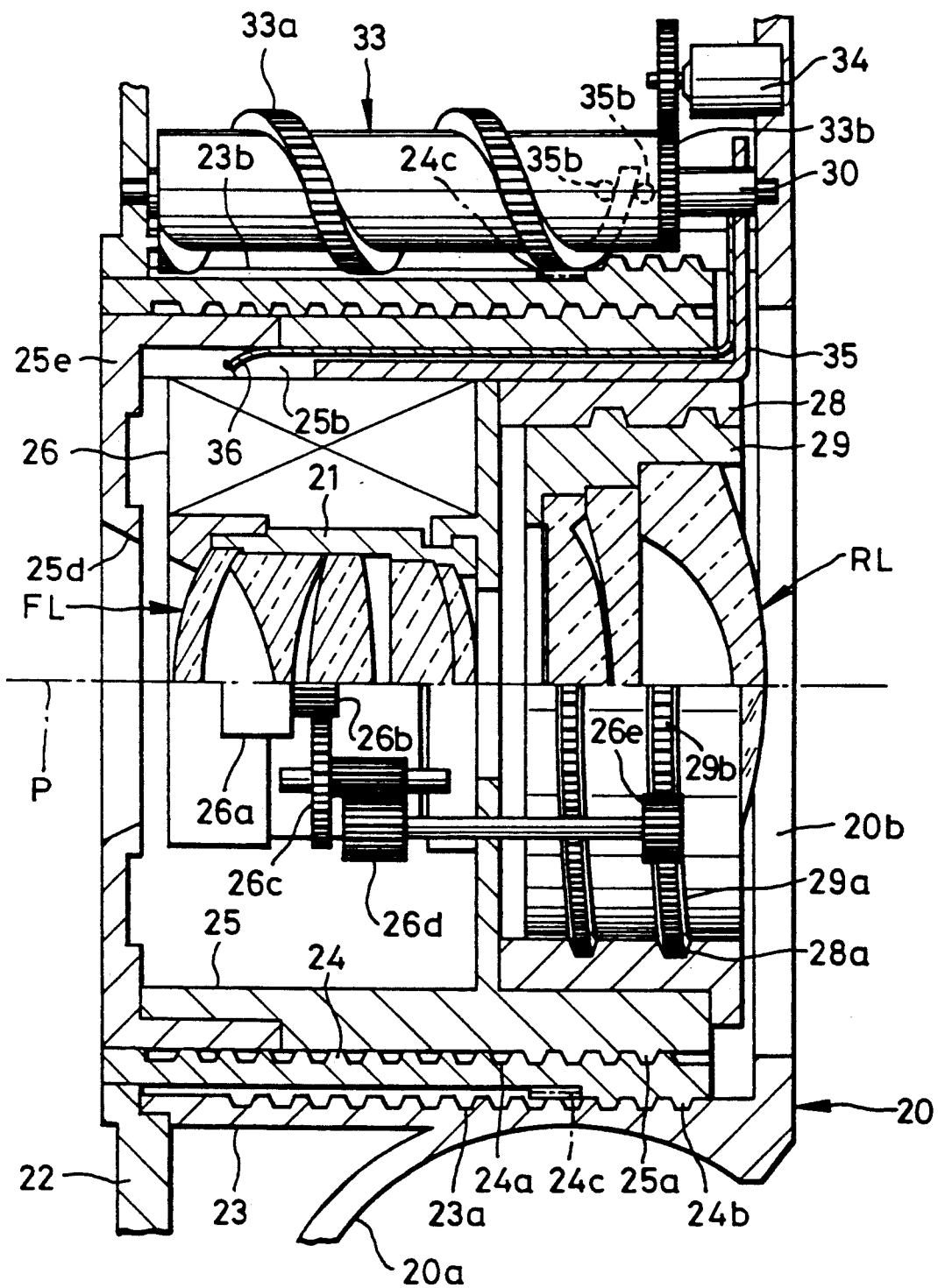
FIG. 1 is a view, partly schematic and partly in cross section, of a zoom lens assembly according to the present invention, in a retracted position.
Figure 2:
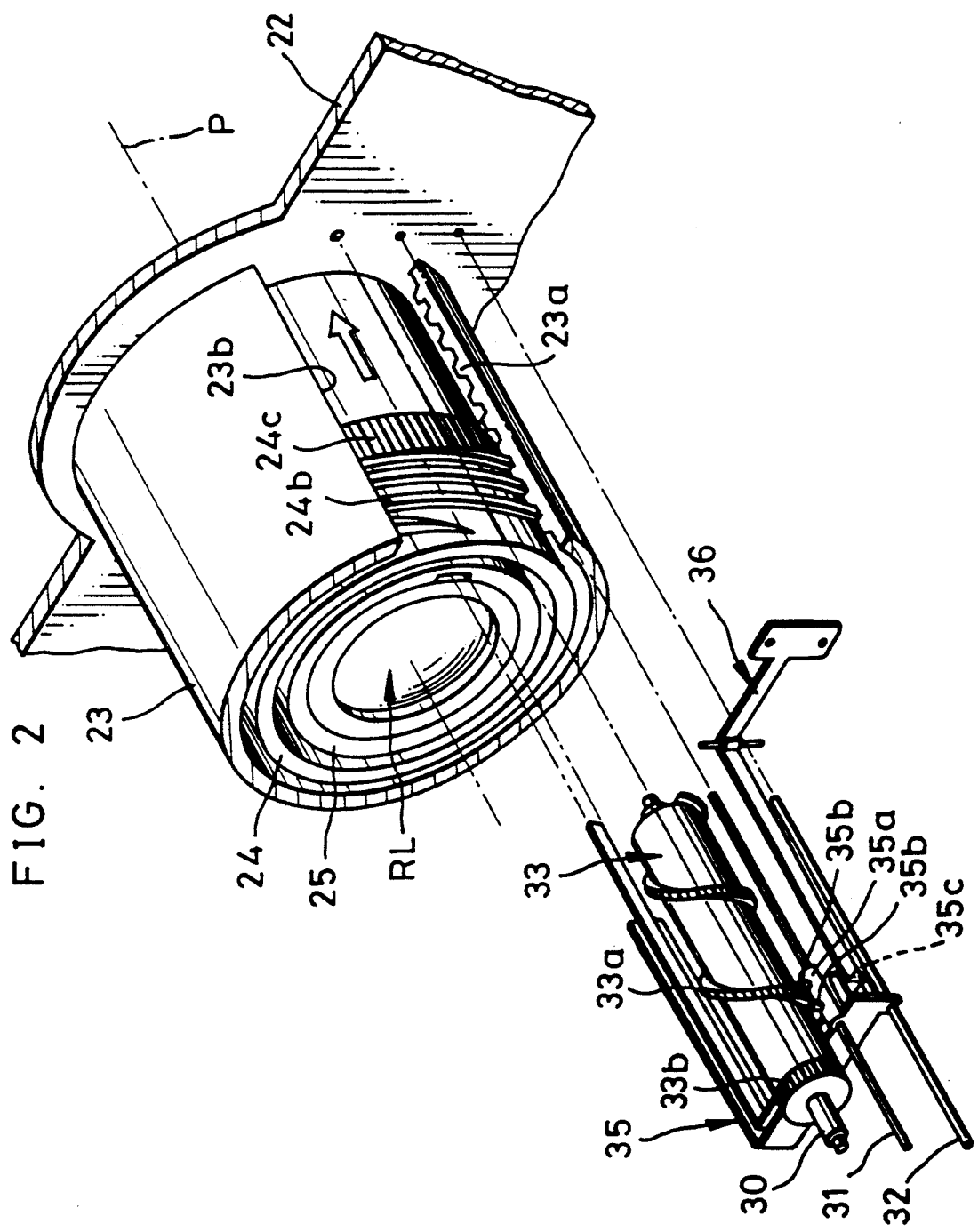
FIG. 2 is an exploded perspective view of the zoom assembly of FIG. 1 from inside of the camera body.
Figure 3:
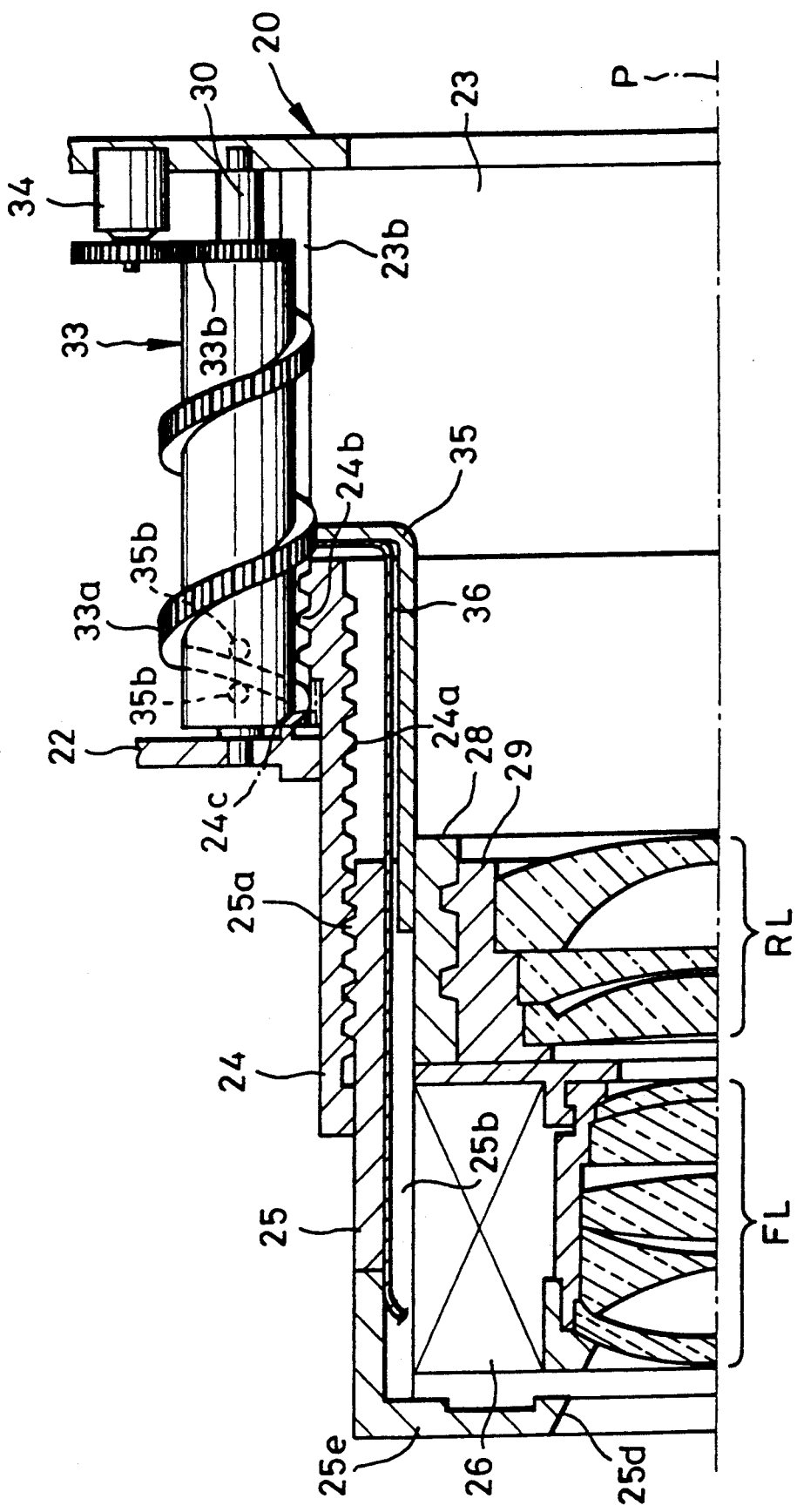
FIG. 3 is a view, partly schematic and partly in cross section, of the zoom lens assembly in a telephoto position.

Referring now to the drawings, wherein like reference numerals designate like or corresponding parts throughout the several views, FIGS. 1 to 3 show the first embodiment of the present invention, wherein a zoom lens system includes a front lens group FL composed of five lens elements and a rear lens group RL composed of three lens elements. In a telephoto range, the front lens group FL and the rear lens group RL are moved forwardly parallel to the optical axis P of the zoom lens system, to provide a long focal distance. The forward movement of those lens groups is less in a wide-angle range, and the zoom lens system is retracted inside a camera body 20 in a retracted position. The rear lens group RL is used for correcting the shift of focus caused by zooming, and for focusing in cooperation with an autofocus system.

Figure 9:
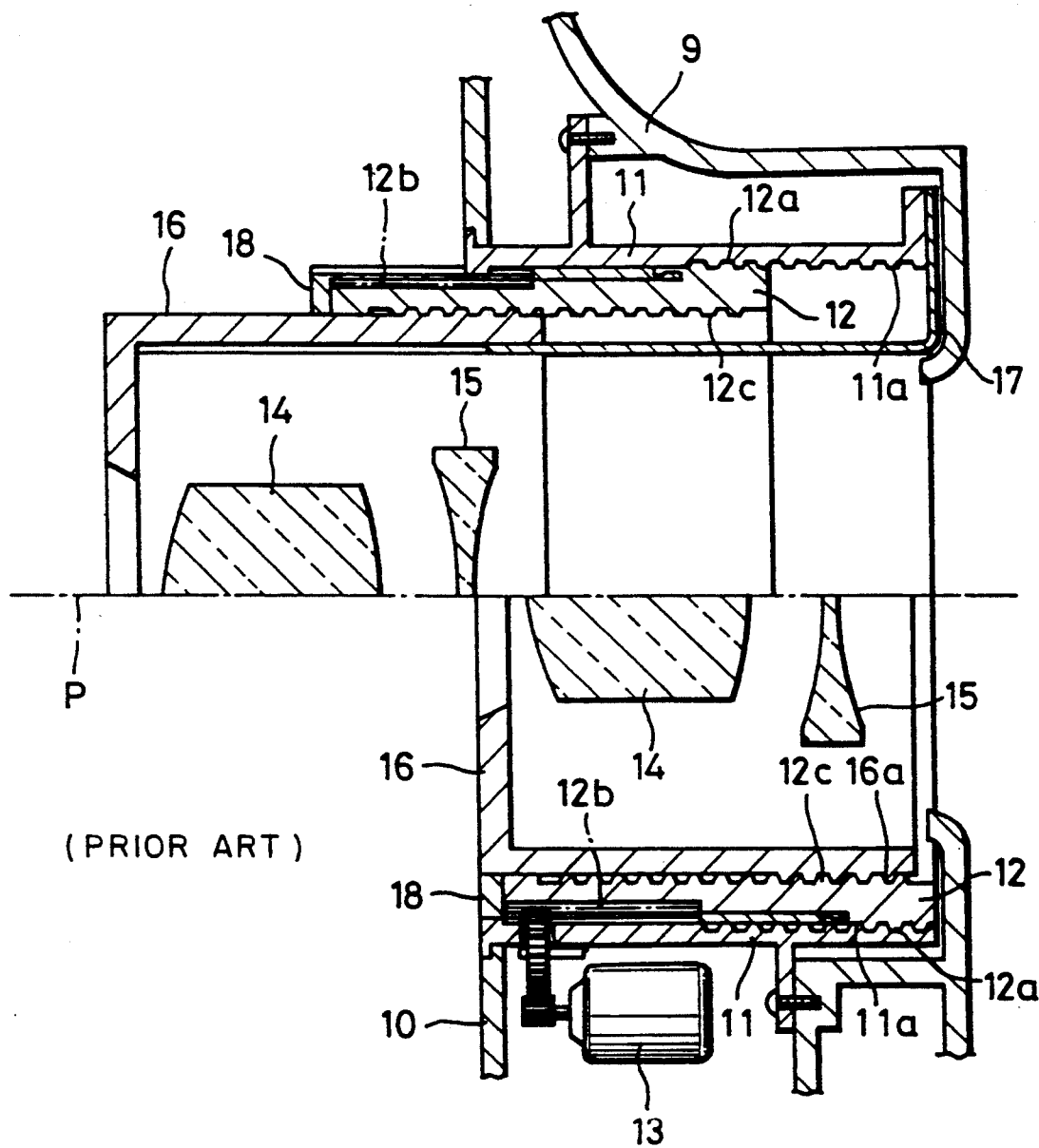
FIG. 9 is a cross sectional view of a conventional zoom lens assembly.

The camera body 20 is integrally formed with a stationary barrel 23. A middle barrel 24 is coupled to the inner periphery of the stationary barrel 23 through a helicoid mechanism such that the middle barrel 24 moves in the direction of the optical axis P when rotated in barrel 23. A movable barrel 25 is coupled to the inner periphery of the middle barrel 24 through a helicoid mechanism. The movable barrel 25 is adapted to move rectilinearly in the axial direction P within the middle barrel 24, because a straight guide member 35 prevents the movable barrel 25 from rotating. The camera body 20 is provided with a film supply chamber 20a and other structure which is also formed integrally with the camera body 20. Therefore, the camera incorporating the zoom assembly according to the present embodiment will be compact compared with cameras using conventional zoom lens assemblies whose stationary barrels are secured as separate members to the camera bodies, as is shown in FIG. 9. Although conventional cameras have a film advancing gear which is mounted on a shaft embedded in the camera body, a film advancing gear of the camera according to the present invention as shown in FIGS. 1-3 meshes with a shaft (not shown) formed integrally with the camera body 20. Designated by 20b is an exposure aperture formed in the camera body 20, and 22 is a front cover covering the front of the camera body 20.

The front lens group FL is held by a lens holder 21 which is fixedly coupled to the movable barrel 25 through a well-known bayonet coupling or the like. The rear lens group RL is held by a lens holder 29 which is helically slidably fitted in a holder support 28. Designated by 26 is a shutter block.

The holder support 28 is fixedly fitted in the movable barrel 25 from the rear of the movable barrel 25. On the inner periphery of the holder support 28, there is formed an internal helicoidal thread 28a, which engages with an external helicoidal thread 29a formed on the outer periphery of the lens holder 29. The external helicoidal thread 29a has gear teeth 29b formed on the crest thereof so that the external helicoidal thread 29a serves also as a helicoidal rack, which engages with gears 26b, 26c, 26d and 26e. Through this gear mechanism, rotational movement of a focusing motor 26a is transmitted to the lens holder 29. The focusing motor 26a is secured to the outer periphery of the lens holder 21. In this way, the lens holder 29 holding the rear lens group RL is rotated by the focusing motor 26a so as to move back and forth according to the pitch of the external helicoidal thread 29a during zooming. The rear lens group RL is moved back and forth also for focusing.

The movable barrel 25 is formed on a rear side portion thereof with an external helicoidal thread 25a, which engages with an internal helicoidal thread 24a formed in the middle barrel 24 over almost the entire length thereof. A rectilinear movement guide member 35 is fitted in a groove 25b formed in an inner wall portion of the movable barrel 25, so that the movable barrel 25 moves back and forth rectilinearly, that is, without rotation, along the rectilinear movement guide member 35. Designated by 25e is a cover frame attached to the front of the movable barrel 25, and 25d is an opening formed in the cover frame 25e. The middle barrel 24 is formed on a rear portion thereof with an external helicoidal thread 24b, which engages with the internal helicoidal thread 23a formed in the stationary barrel 23 over almost the entire length thereof. When rotated by a cylindrical middle barrel driving member 33, the middle barrel 24 moves back and forth according to the pitch of the external helicoidal thread 24b.

The middle barrel 24 is also provided with a narrow gear portion 24c formed around the outer periphery thereof forwardly of the external helicoid thread.

The stationary barrel 23 is formed with an elongated cut-out 23b extending in the axial direction P, as shown in FIG. 2. A shaft 30 and a pair of guide axles 31 and 32 are disposed outside of the cut-out 23b and extend parallel to the optical axis P and are supported at opposite ends by the stationary barrel 23 and the front cover 22. The middle barrel driving member 33, which is rotatably mounted on the shaft 30, is provided with a helical rack 33a whose teeth are formed in a series extending helically about the outer periphery of the middle barrel driving member 33, each tooth of rack 33a extending parallel to the optical axis P. A gear portion 33b is formed on the outer periphery of a rear end portion of the middle barrel driving member 33. Rotational movement of a zoom motor 34, which is mounted on the camera body 20, is transmitted to the middle barrel driving member 33 through the gear portion 33b thereof, thereby rotating the middle barrel driving member 33. The helical rack 33a meshes with the gear portion 24c of the middle barrel 24 through the cut-out 23b. Although the position of the teeth of the helical rack 33a in mesh with 24c shifts by a predetermined amount in the direction of optical axis P for each tooth while the middle barrel driving member is rotated, because this predetermined amount is equal to the amount of axial movement of the middle barrel 24 when it is rotated by an angle corresponding to one tooth of the gear portion 24c, the helical rack 33a always meshes with the gear portion 24c even while the middle barrel 24 is in motion.

The rectilinear movement guide member 35, which moves axially along the guide axles 31 and 32, is provided with a guide cylinder 35a formed integrally therewith. Two guide pins 35b embedded in the guide cylinder 35a are arranged so as to engage the helical rack 33a on opposite sides thereof, so that the rectilinear movement guide member 35 moves according to the shift of teeth position of the helical rack 33a. In this way, the rectilinear movement guide member 35 moves along with the middle barrel 24 in the direction of optical axis P.

A flexible sheet 36 printed with conductive lead wires is disposed between the rectilinear movement member 35 and the movable barrel 25. One end of the flexible sheet 36 is electrically connected to the shutter block 26, whereas the other end of the flexible sheet 36 extends into the camera body 20 through a pressure roller 35c mounted the rectilinear movement guide member 35, and is electrically connected to a circuit disposed within the camera body 20. When the pressure roller 35c moves rearwardly together with the rectilinear movement guide member 35, the flexible sheet 36 is drawn into the camera body 20.

The operation of the above-described zoom lens assembly will next be described briefly.

When a power switch (not shown) of the camera is turned off, the zoom lens assembly is positioned in the retracted position as shown in FIG. 1. In this position, the movable barrel 25 and the middle barrel 24 are accommodated within the stationary barrel 23, while the gearing portion of the helical rack 33a in engagement with the gear portion 24c is disposed in the elongated cut-out 23b of the stationary barrel 23 at a rear portion thereof. The guide pins 35b engaging the helical rack 33a at its opposite sides are located at a rear end of the helical rack 33a. Accordingly, the rectilinear guide member 35 is disposed at a rear end portion of the guide axles 31 and 32, and the flexible sheet 36 is drawn into the camera body 20 by means of the pressure roller 35c.

When the power switch is turned on, the zoom lens assembly is automatically placed in a wide-angle end position in which the focal length is the shortest and the middle barrel 24 and the movable barrel 25 protrude slightly from the front cover 22. For setting the zoom assembly in the wide-angle end position, the zoom motor 34 rotates forwardly so that the middle barrel driving member 33 rotates to cause the middle barrel 24 to rotate relative to the stationary barrel 23 through the engagement of the helical rack 33a with the gear portion 24c. Although the middle barrel 24 moves forwardly by being rotated, because the engaged portion of the helical rack 33a also moves along with the movement of the middle barrel 24, the helical rack 33a is maintained engaged with the gear portion 24c.

The movable barrel 25 is also urged to rotate with the middle barrel 24, but cannot rotate because of the rectilinear movement guide member 35 which is inserted in the groove 25b of the movable barrel 25, so that the movable barrel 25 moves rectilinearly, guided by the rectilinear movement guide member 35. The guide member 35 moves together with the middle barrel 24, because the guide member 35 cooperates with the helical rack 33a through the guide pins 35b. Furthermore, the flexible sheet 36 is drawn out of the camera body 20 with the forward movement of the movable barrel 25, because the one end of the flexible sheet 36 is connected to the shutter block 26. The pressure rollers 35c also move together with the movable barrel 25, facilitating the forward movement of the flexible sheet 36.

Upon movement of the movable barrel 25 from the retracted position forwardly into the wide-angle end position, the focusing motor 26a rotates. The rotary movement of the focusing motor 26a is transmitted to the lens holder 29 through the gears 26b, 26c, 26d, 26e and 29b, so that the lens holder 29 moves helically relative to the holder support 28 so as to maintain the focus despite zooming.

When a zoom switch (not shown) is operated during framing, the zoom motor 34 rotates as long as the zoom switch is operated, so that the zoom assembly is positioned in an appropriate position within a range between the wide-angle end position and a telephoto end position in which the focal length is the longest. The telephoto end position is shown in FIG. 3. For example, when the zoom switch is operated so as to set a telephoto state, the zoom motor 34 further rotates forwardly, so that the middle barrel 24 and the movable barrel 25 further move forwardly toward the telephoto end position, and thus the focal length of the zoom lens system becomes longer. The focusing motor 26a also rotates with the movement of the barrels so as axially to move the rear lens group RL to maintain focus despite zooming. When photographing, the focusing motor 26a again rotates to move the rear lens group RL axially for focusing corresponding to the subject distance signal from the autofocus system.

When the zoom switch is operated so as to set a wide-angle state, the zoom motor 34 rotates reversely, thereby moving the middle barrel 24 and the movable barrel 25 rearwardly toward the wide-angle end position, so that the focal length becomes shorter. When the power switch is turned off after photographing, the zoom motor 34 is automatically rotated reversely, so that the middle barrel 24 and the movable barrel 25 retract inside the stationary barrel 23 as shown in FIG. 1. Because the pressure roller 35c also moves rearwardly with the movable barrel 25, the flexible sheet 36 is safely drawn into the camera body 20.

Figure 4:
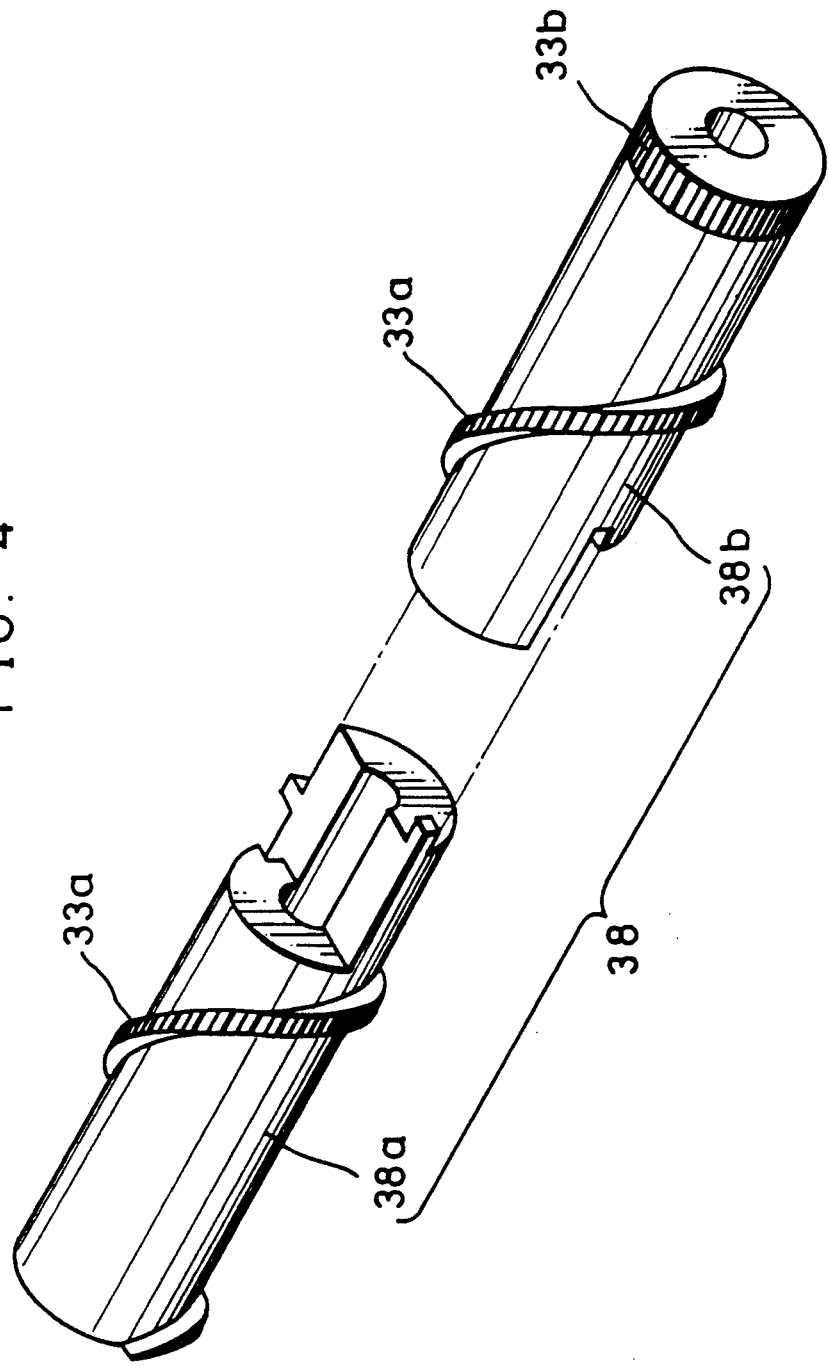
FIG. 4 is an exploded perspective view of a middle barrel driving member according to another embodiment.

FIG. 4 shows another embodiment of the middle barrel driving member. The middle barrel driving member 38 of FIG. 4 is comprised by a right half portion 38b and a left half portion 38a with the angle of a helical rack 33a on the outer periphery thereof 360°. The left and right half portions 38a and 38b are axially separable from each other, but can be engaged with each other in radial and circular directions, so that these portions rotate as one body.

Figure 5:
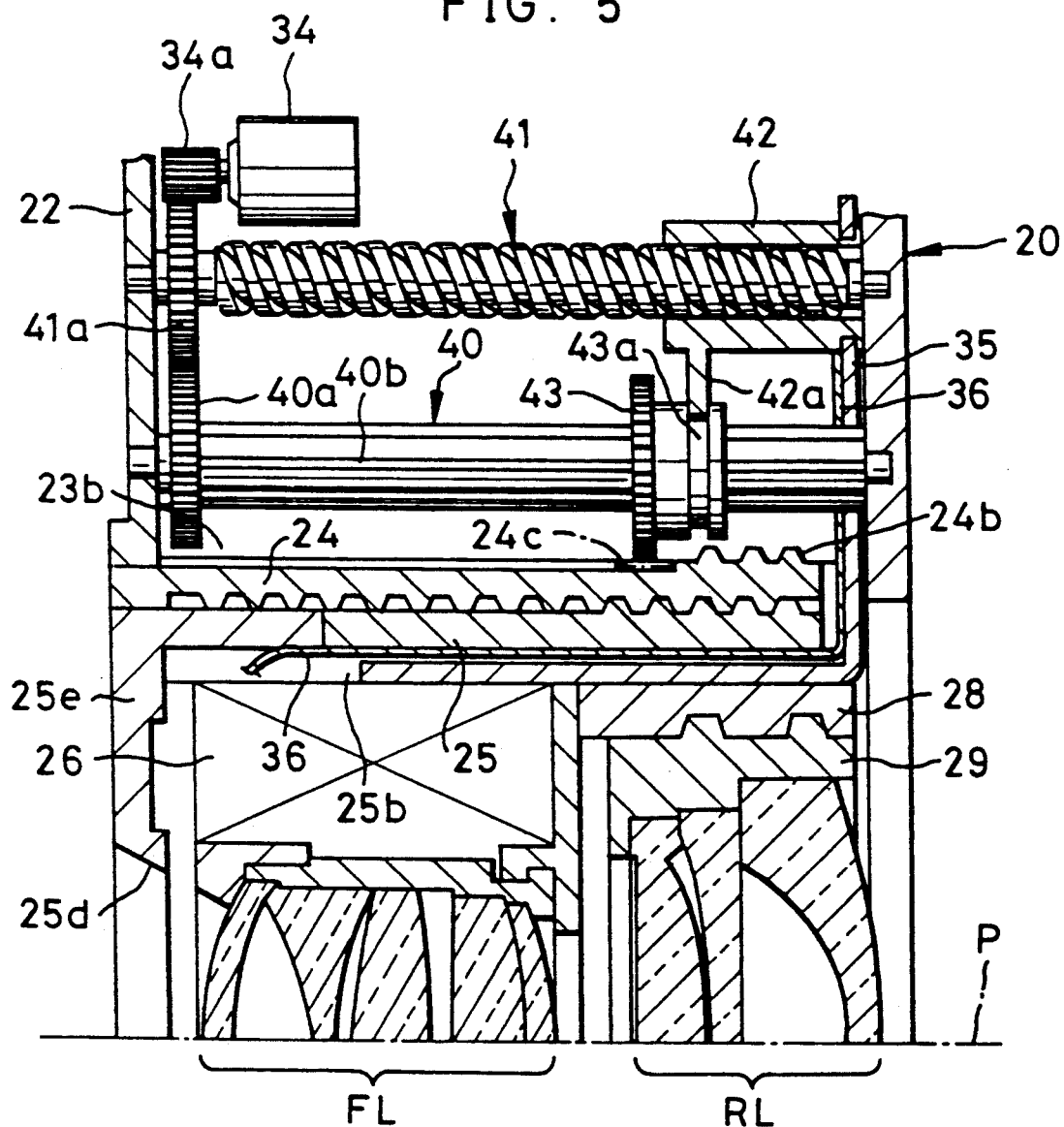
FIG. 5 is a fragmentary cross sectional view of a zoom lens assembly according to another embodiment of the present invention, embodying a pinion slidable in the direction of the optical axis.

FIG. 5 shows a zoom assembly using a movable pinion according to another embodiment of the present invention, wherein a spline shaft 40 having spline grooves 40b extending in the axial direction, and a feed screw 41, are rotatably mounted between front cover 22 and camera body 20. The spline shaft 40 and the feed screw 41 have fixed thereon gears 40a and 41a, respectively, which mesh with each other. A gear 34a of a zoom motor 34 meshes with the gear 41a, so that the rotational movement of the zoom motor 34 is transmitted to the spline shaft 40 and the feed screw 41.

The feed screw 41 engages with a nut 42, which is secured at its rear end to a rectilinear movement guide member 35. The spline shaft 40 engages with a pinion 43 which is slidably fitted on the spline barrel 40 and meshes with a gear portion 24c of a middle barrel 24. So as to slide the pinion 43 responsive to movement of the nut 42, a projection 42a of the nut 42 fits in a groove 43a of the pinion 43. The pitch of the feed screw 41 is such that the nut 42 moves in the same direction by the same distance as the middle barrel 24.

According to the just-described embodiment, the spline shaft 40 is rotated by the zoom motor 34, so that the pinion 43 rotates together with the spline shaft 40, thereby rotating the middle barrel 24 through the pinion 43 and the gear portion 24c. While rotating, the middle barrel 24 moves in the direction of optical axis P in the same way as described above. On the other hand, the feed screw 41 is also rotated by the zoom motor 34, so that the nut 42 is moved together with the rectilinear movement guide member 35 in the direction of optical axis P. In cooperation with the movement of the nut 42, the pinion 43 moves along on the spline shaft 40. As a result, the pinion 43 and the gear portion 24c move in the same direction by the same amount, so that the pinion 43 and the gear portion 24a will not disengage from each other. It is to be noted that the nut 42 is provided with a pressure roller similar to 35c; and although it is omitted from FIG. 5 for clarity, a flexible sheet similar to 36 also moves along with the movable barrel 25. The feed screw 41 of this embodiment makes the production of the zoom lens assembly easier and the cost thereof lower, compared with the first embodiment which uses the middle barrel driving member 33 with the helical rack 33a.

Figure 6:
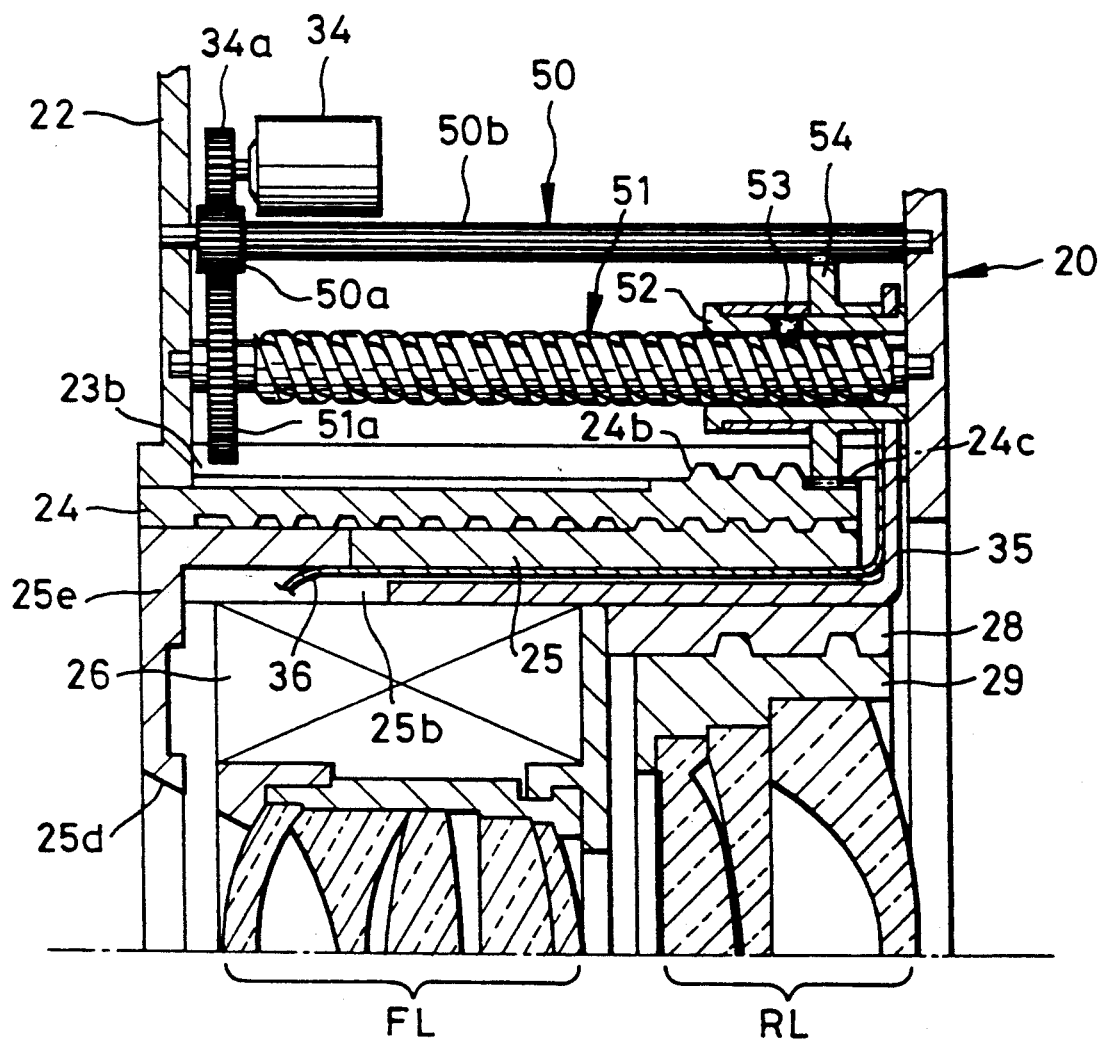
FIG. 6 is a view similar to FIG. 5 but showing a modification of the zoom lens assembly of FIG. 5.

FIG. 6 shows a modification of the zoom lens assembly shown in FIG. 5. In this modification, a gear shaft 50 and a feed screw 51 with a helical groove formed thereon are rotatably supported between the front cover 22 and the camera body 20. The gear shaft 50 has a shaft portion 50b and a gear 50a of different diameter, which is formed at the front end of the shaft portion 50b integrally therewith. The gear 50a meshes with the gear 34a of the zoom motor 34, whereas each tooth of the shaft portion 50b has a length substantially equal to the maximum amount of axial movement of the gear portion 24c of the middle barrel 24. The feed screw 51 is provided at its front end with a gear 51a which meshes with the gear 50a. The feed screw 51 fits at its rear end into a bush 52, which holds a ball 53 fitted in the helical groove of the feed screw 51. A pinion 54 is rotatably mounted on the outer periphery of the bush 52, and meshes with the gear portion 24c of the middle barrel 24. The rectilinear movement guide member 35 is secured to the rear end of the bush 52.

In the FIG. 6 embodiment, the zoom motor 34 causes the gear shaft 50 and the feed screw 51 to rotate. As a result, the pinion 54 is also rotated, because the pinion 54 meshes with the portion 50b of the gear shaft 50, thereby rotating the middle barrel 24 and thus moving it in the axial direction. At the same time, the rotation of the feed screw 51 causes the bush 52 to move with the pinion 54 in the axial direction, so that the pinion 54 and the gear portion 24c move together, thus maintaining the engagement therebetween. According to this embodiment, because the gear shaft 50 replaces the relatively expensive spline shaft 40 of FIG. 5, the cost of the zoom lens assembly will be lowered.

Figure 7:
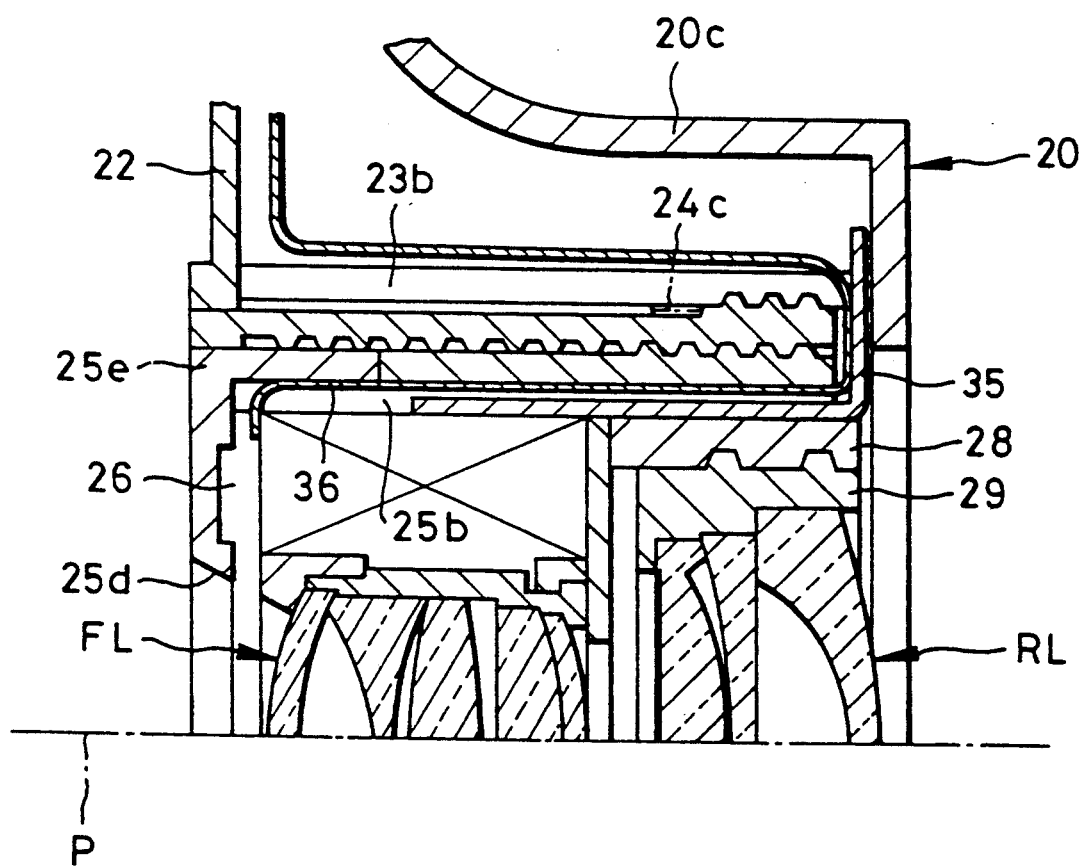
FIG. 7 is a view similar to FIG. 5 but showing still another embodiment of a zoom lens assembly positioned in its retracted position, wherein a movable barrel moves axially twice as far as a middle barrel, and wherein a flexible conductor sheet follows the movable barrel without slackening.
Figure 8:
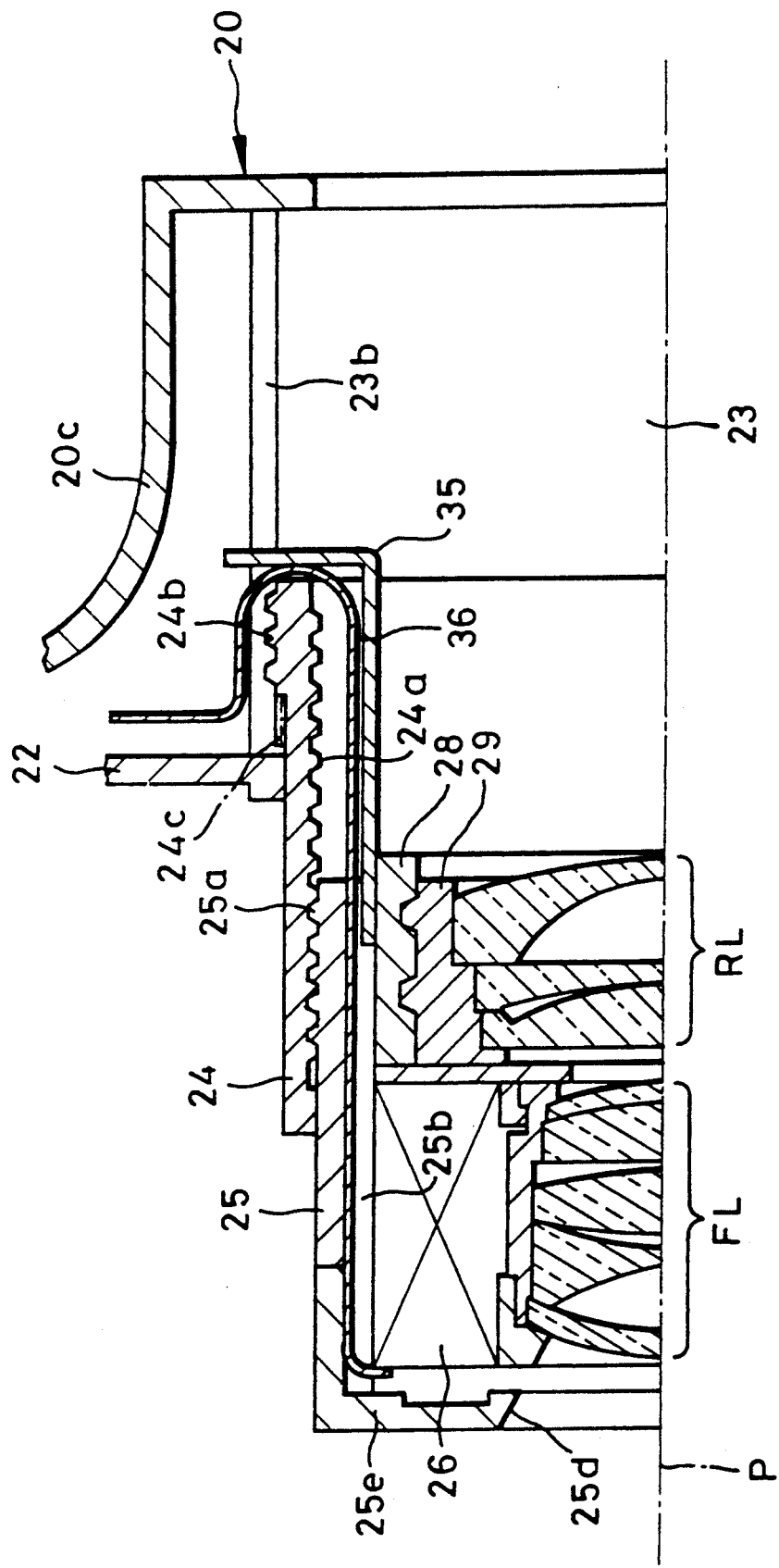
FIG. 8 is a view similar to FIG. 7 but showing the zoom lens assembly of FIG. 7 positioned in its telephoto range.

In an embodiment shown in FIGS. 7 and 8, the pitches of the external helicoidal threads 24b and 25a are such that the amount of axial movement of the movable barrel 25 will be twice as great as that of the middle barrel 24, and the flexible sheet 36 is secured at its one end to the front cover 22 whereas the other end is connected to the shutter block 26 inside the movable barrel 25. According to this embodiment, the flexible sheet 36 extending between the middle barrel 24 and the rectilinear movement guide member 35 always has no slack and has a constant length. When the middle and movable barrels move, the flexible sheet 36 follows the axial movement of the middle barrel 24 without slackening, curving round the rear end of the middle barrel 24, even when the pressure roller 35c as shown in FIG. 2 is not provided. Therefore, the cost of assembling the flexible sheet 36 is lowered.

Reference numeral 20c designates a wall of a film take-up chamber of the camera body 20.

It is also preferable to provide that the amount of axial movement of the movable barrel 25 will be twice as large as that of the middle barrel 24 in the embodiments shown in FIGS. 1 to 6. In this way, the zoom lens assembly will be most compact, while the possible axial movement of the zoom lens assembly will be the greatest.

Although the invention has been described in detail above with reference to the embodiments shown in the drawings, the present invention is not to be limited to those embodiments, as various modifications of the present invention can be effected within the spirit and scope of the appended claims.

What is claimed is:

1. A zoom lens assembly having a zoom lens system comprising:

a stationary barrel having a first helicoidal thread formed on an inner surface thereof;

a middle barrel rotatable inside said stationary barrel and movable in a direction parallel to an optical axis of said zoom lens system when rotated, said middle barrel having a second helicoidal thread and a first gear, which are formed on an outer periphery at a rear end of said middle barrel, and a third helicoidal thread formed on an inner surface of said middle barrel;

a movable barrel holding said zoom lens system therein, said movable barrel being rectilinearly movable inside said middle barrel parallel to said optical axis, and having a fourth helicoidal thread formed on an outer periphery at a rear end thereof, said fourth helicoidal thread engaging with said third helicoidal thread; and driving means for rotating said middle barrel, said driving means having a second gear which meshes with said first gear, said second gear maintaining engagement with said first gear throughout the movement of said middle barrel in a direction parallel to said optical axis.

2. A zoom lens assembly as recited in claim 1, wherein said stationary barrel has a cut-out extending parallel to said optical axis in a region corresponding to the range of movement of said first gear, said second gear meshing with said first gear through said cut-out.

3. A zoom lens assembly as recited in claim 1, further comprising a rectilinear movement guide member for preventing said movable barrel from rotating so as to move said movable barrel rectilinearly, said rectilinear movement guide member being fitted in a straight groove formed in said movable barrel and extending parallel to said optical axis, and said rectilinear movement guide member moving in cooperation with said driving means in the same direction by the same distance as said middle barrel.

4. A zoom lens assembly as recited in claim 3, further comprising a flexible sheet for sending electric signals to a shutter device disposed in said movable barrel, said flexible sheet extending through said straight groove of said movable barrel.

5. A zoom lens assembly as recited in claim 4, further comprising a roller for guiding said flexible sheet, said roller moving together with said rectilinear movement guide member.

6. A zoom lens assembly as recited in claim 1, wherein the parts thereof are so proportioned that the amount of axial movement of said movable barrel is twice the amount of axial movement of said middle barrel.

7. A zoom lens assembly as recited in claim 1, wherein said first gear has a short length and is disposed next to said second helicoidal thread.

8. A zoom lens assembly as recited in claim 1, wherein said driving means includes a zoom motor which rotates during zooming.

9. A zoom lens assembly as recited in claim 8, wherein said driving means comprises a middle barrel driving member which is rotated by said zoom motor, said middle barrel driving member having a shaft portion, a helical ridge formed on an outer periphery of said shaft portion, said second gear being formed in said helical ridge.

10. A zoom lens assembly as recited in claim 9, wherein said rectilinear movement guide member is guided by said helical ridge.

11. A zoom lens assembly as recited in claim 10, wherein said rectilinear movement guide member has two follower pins engaging said helical ridge at opposite sides thereof.

12. A zoom lens assembly as recited in claim 9, middle barrel driving member is comprised by two pieces which correspond to half portions divided at a middle of said shaft portion, said pieces being removably coupled to each other so as to be rotatable as one body.

13. A zoom lens assembly as recited in claim 8, wherein said driving means comprises a feed screw and a splined shaft which are rotated by said zoom motor and extend parallel to said optical axis, a nut engaging with said feed screw and moving axially upon rotation of the feed screw, and a coupling member cooperating with said nut and moving said second gear along said splined shaft.

14. A zoom lens assembly as recited in claim 13, wherein said rectilinear movement guide member is secured to said nut.

15. A zoom lens assembly as recited in claim 8, wherein said driving means comprises a feed screw and a gear shaft which are rotated by said zoom motor and extend parallel to said optical axis, a helical groove formed on said feed screw, and a bush movable in the axial direction by said helical groove, and wherein said second gear is rotatably fitted on said bush, and each tooth of said gear shaft having a length corresponding to the maximum amount of axial movement of said first gear.

16. A zoom lens assembly as recited in claim 15, wherein said bush holds a ball which fits in said helical groove.

17. A zoom lens assembly as recited in claim 1, wherein said stationary barrel is formed integrally with a camera body.

18. A zoom lens assembly as recited in claim 1, wherein an outer periphery of said stationary barrel is covered by a front cover.

19. A zoom lens assembly as recited in claim 1, wherein a stationary lens holder and a movable lens holder are disposed in said movable barrel, said stationary lens holder holding a front lens group of said zoom lens system, and said movable lens holder holding a rear lens group of said zoom lens system.

20. A zoom lens assembly as recited in claim 19, further comprising a focusing mechanism for moving said movable lens holder parallel to said optical axis.

21. A zoom lens assembly as recited in claim 20, wherein said focusing mechanism comprises a focusing motor, a third gear rotated by said focusing motor, a fourth gear formed on an outer periphery of said movable lens holder, said fourth gear extending helically as a rack and meshing with said third gear, and a holder support engaging with said movable lens holder through a helicoid mechanism consisting of said fourth gear as an external thread, said holder support being secured inside said movable barrel, and wherein said movable lens holder is moved parallel to said optical axis when rotated by said focusing motor.

22. A zoom lens assembly having a zoom lens system comprising:
   a stationary barrel having a first helicoidal thread formed on an inner surface thereof and a cut-out extending parallel to an optical axis of said zoom lens system;
   a middle barrel rotatable inside said stationary barrel and movable in a direction parallel to said optical axis when rotated, said middle barrel having a second helicoidal thread and a first gear, which are formed on an outer periphery at a rear end of said middle barrel, and a third helicoidal thread formed on an inner surface of said middle barrel;
   a movable barrel holding said zoom lens system therein, said movable barrel being rectilinearly movable inside said middle barrel parallel to said optical axis, and having a fourth helicoidal thread formed on an outer periphery at a rear end thereof, said fourth helicoidal thread engaging with said third helicoidal thread; and
   a middle barrel driving member for rotating said middle barrel, said middle barrel driving member having formed on an outer periphery thereof a second gear which meshes with said first gear through said cut-out, a region of engagement of said second gear with said first gear moving in the same direction by the same distance as said first gear; and
   a zoom motor for rotating said middle barrel driving member such that, when said middle barrel driving member is rotated, said middle barrel is rotated through said second and first gears.

23. A zoom lens assembly as recited in claim 22, further comprising a rectilinear movement guide member for preventing said movable barrel from rotating so as to move said movable barrel rectilinearly, said rectilinear movement guide member being fitted in a straight groove formed in said movable barrel parallel to said optical axis, and said rectilinear movement guide member being guided by said second gear so as to move in the same direction by the same distance as said middle barrel.

24. A zoom lens assembly as recited in claim 22, wherein the parts thereof are so proportioned that the amount of axial movement of said movable barrel is twice the amount of axial movement of said middle barrel.

25. A zoom lens assembly as recited in claim 22, wherein said middle barrel driving member is comprised by two pieces which correspond to half portions divided at a middle of said shaft portion, said pieces being removably coupled to each other so as to be rotatable as one body.

26. A zoom lens assembly having a zoom lens system comprising:
   a stationary barrel having a first helicoidal thread formed on an inner surface thereof and a cut-out extending parallel to an optical axis of said zoom lens system;
   a middle barrel rotatable inside said stationary barrel and movable in a direction parallel to said optical axis when rotated, said middle barrel having a second helicoidal thread and a first gear, which are formed on an outer periphery at a rear end of said middle barrel, and a third helicoidal thread formed on an inner surface of said middle barrel;
   a movable barrel holding said zoom lens system therein, said movable barrel being rectilinearly movable inside said middle barrel parallel to said optical axis, and having a fourth helicoidal thread formed on an outer periphery at a rear end thereof, said fourth helicoidal thread engaging with said third helicoidal thread; and
   means for rotating said middle barrel, said means including a feed screw and a splined shaft each extending parallel to said optical axis, a zoom motor for rotating said feed screw and said splined shaft, a second gear slidably fitted on said splined shaft and meshing with said first gear through said cut-out, a nut engaging with said feed screw such that said nut is moved in the same direction by the same distance as said first gear when said feed screw is rotated, and a coupling member causing said second gear to move along said splined shaft in cooperation with the movement of said nut such that, when said feed screw and said splined shaft are rotated, said second gear rotates said first gear and moves in the same direction by the same distance as said first gear so as to rotate said middle barrel.

27. A zoom lens assembly as recited in claim 26, further comprising a rectilinear movement guide member for preventing rotation of said movable barrel so as to move the movable barrel rectilinearly, said rectilinear movement guide member being secured at a rear end thereof to said nut and being fitted at a front end thereof in a straight groove formed in said movable barrel parallel to said optical axis.

28. A zoom lens assembly as recited in claim 26, wherein the parts thereof are so proportioned that the amount of axial movement of said movable barrel is twice the amount of axial movement of said middle barrel.

29. A zoom lens assembly having a zoom lens system comprising:
   a stationary barrel having a first helicoidal thread formed on an inner surface thereof and a cut-out extending parallel to an optical axis of said zoom lens system;
   a middle barrel rotatable inside said stationary barrel and movable in a direction parallel to said optical axis when rotated, said middle barrel having a second helicoidal thread and a first gear, which are formed on an outer periphery at a rear end of said middle barrel, and a third helicoidal thread formed on an inner surface of said middle barrel;
   a movable barrel holding said zoom lens system therein, said movable barrel being rectilinearly movable inside said middle barrel parallel to said optical axis, and having a fourth helicoidal thread formed on an outer periphery at a rear end thereof, said fourth helicoidal thread engaging with said third helicoidal thread; and
   means for rotating said middle barrel, said means including a feed screw and a gear shaft each extending parallel to said optical axis, a zoom motor for rotating said feed screw and said gear shaft, a bush fitted on said feed screw and movable in the same direction by the same amount as said first gear, and a second gear rotatably fitted on said bush, said second gear meshing with said gear shaft and, through said cut-out, with said first gear, each tooth of said gear shaft having a length corresponding to the maximum amount of axial movement of said first gear, and wherein
   said second gear rotates said first gear and moves in the same direction by the same distance as said first gear so as to rotate said middle barrel when said feed screw and said gear shaft are rotated.

30. A zoom lens assembly as recited in claim 29, wherein said feed screw is provided with a helical groove, and said bush holds a ball which fits into said helical groove.

31. A zoom lens assembly as recited in claim 29, wherein the parts thereof are so proportioned that the amount of axial movement of said movable barrel is twice the amount of axial movement of said middle barrel.

32. A zoom lens assembly having a stationary barrel, a middle barrel mounted in said stationary barrel by a helicoid mechanism, and a movable barrel mounted in said middle barrel by a helicoidal mechanism such that said movable barrel holding a zoom lens system is moved parallel to an optical axis of said zoom lens system by rotating said middle barrel, said zoom lens assembly comprising:
   a first gear provided on said middle barrel; and
   a middle barrel driving member provided in a camera body for rotating said middle barrel, said middle barrel driving member having a second gear which meshes with said first gear, a region of engagement of said second gear with said first gear moving in the same direction by the same distance as said first gear.

33. A zoom lens assembly as recited in claim 32, wherein a rectilinear movement guide member for guiding said movable barrel so as to move rectilinearly is moved by said middle barrel driving member in the same direction by the same distance as said middle barrel.

34. A zoom lens assembly as recited in claim 32, wherein the parts are so proportioned that the amount of axial movement of said movable barrel is twice the amount of axial movement of said middle barrel.

* * * * *